Oct. 30, 1962 G. ECKERMANN ETAL 3,061,741
TRANSISTOR CIRCUIT FOR SELECTIVELY SWITCHING
DIRECT CURRENT ENERGY TO A LOAD
Filed Oct. 5, 1959
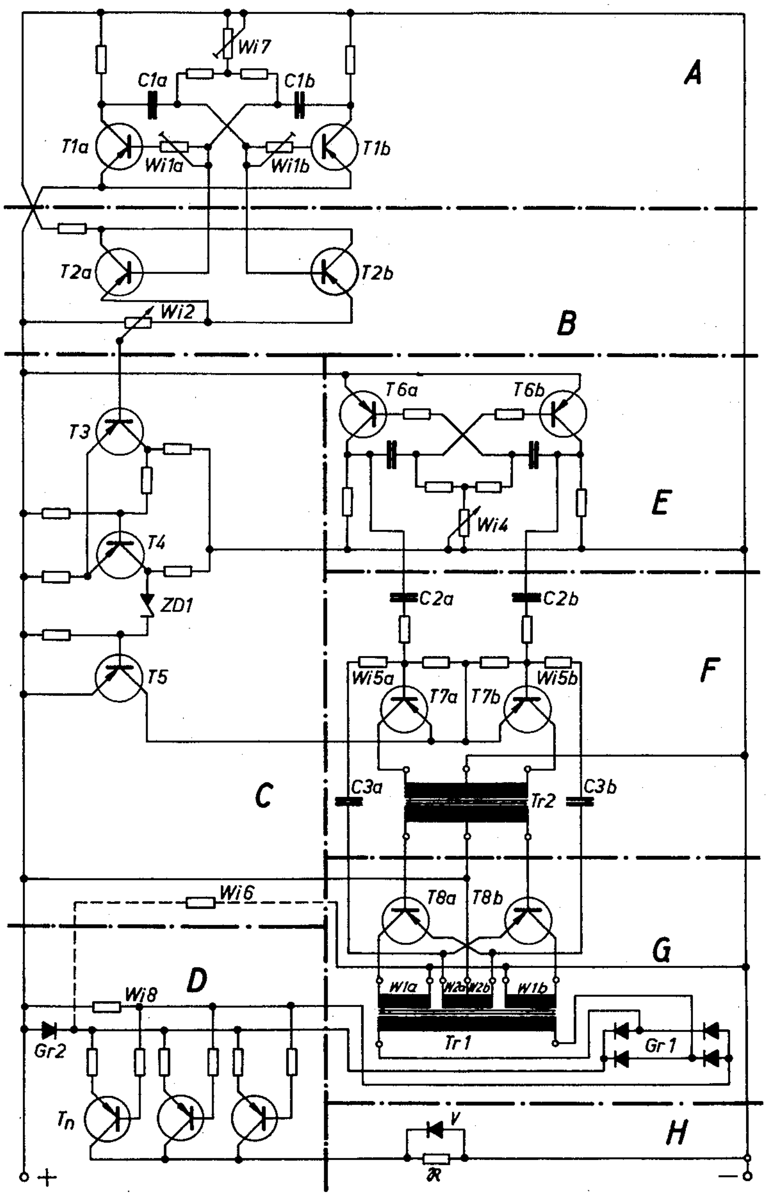
Günter Eckermann
Alfred Walz INVENTORS
BY: Watson, Cole, Grindle, & Watson
Attorneys 3,061,741

TRANSISTOR CIRCUIT FOR SELECTIVELY SWITCHING DIRECT CURRENT ENERGY TO A LOAD

Günter Eckermann, Haus 21c, Mundingen, Baden, Germany, and Alfred Walz, Am Kurzarm 7, Emmendingen, Baden, Germany Filed Oct. 5, 1959, Ser. No. 844,517
Claims priority, application Germany Oct. 3, 1958
14 Claims. (Cl. 307—88.5)

The invention relates to a circuit arrangement for the low-loss control of a consumer requiring direct current energy. For the low-loss regulation of an electric motor the method of the "so-called" spasmodic regulation is known. According to this method the electric motor to be controlled is fed with direct current impulses preferably of the same amplitude and the relative impulse duration of which, that is the ratio of the impulse duration to the duration of the pauses between impulses, can be varied with the result that the direct current consumption of the motor also varies.

The direct current impulses are mostly produced in the known arrangement by using mechanical circuit-breakers. The use of such circuit-breakers is, however, open to certain objections: one objection is the disturbing noise of the circuit-breaker; another the vibration associated with the drive of the circuit-breaker. Moreover, the contact problem of such mechanical circuit-breakers is difficult to solve.

For small capacities it is likewise known to obtain from a fluctuating direct-current potential power impulses of variable duration which serve for controlling a consumer. The power impulses are obtained in a direct-current amplifier built-up of electronic elements and having a back-coupled amplifier stage (unstable tipper) to which a control direct-current is supplied. Such a circuit arrangement is open to objections because within the amplifier a compensation of voltage with a special auxiliary source of voltage and several diodes is necessary. The range of control of such an arrangement is also limited.

According to the invention a rectangular generator stage (multivibrator) comprising R-C members is provided, from which the charging and discharging operations on the condensers are fed as control signal to a push-pull rectifier-amplifier the working resistance of which is constructed as potentiometer so that the voltage peaks occurring at the output of this push-pull rectifier-amplifier and whose amplitude is variable by the potentiometer are fed to the input of an impulse former stage represented by a Schmitt-Trigger connection, so that rectangular impulses occur which are of variable duration depending upon the ratio of the amplitude of the voltage peaks to the input threshold value of the Schmitt-Trigger connection, and that an electronic power switch controlling the power feed to the electric consumer is provided which is switched on with this rectangular impulse sequence. Another electronic amplifier element is preferably aftercoupled to the Schmitt-Trigger connection, which element amplifies the impulse sequence delivered by the Schmitt-Trigger connection in such a manner that the electronic power switch aftercoupled with it is switched out into the saturated range during the duration of impulse. The circuit arrangement can be so constructed that an electronic switch controlled by the rectangular impulse sequence at the output of the impulse former stage is provided for modulating a driver stage which is fed from a multivibrator producing an alternating current impulse sequence of higher frequency than the direct current impulse sequence, so that an alternating current impulse sequence modulated with the direct current impulse sequence occurs in the driver stage, and that the output of the driver stage is conducted over a power end stage and for the impedance transformation via a transformer to a bridge rectifier at the output of which a direct current impulse sequence corresponding to the modulation ratio of the original direct current impulse sequence emerges. The electronic switch controlled by this direct current impulse sequence preferably consists of a plurality of parallel-connected transistors. The remaining electronic amplifier elements may also be semiconductor amplifiers, particularly transistors of both conductivities.

The invention enables the control of a consumer requiring direct current energy, especially the spasmodic regulation of a direct current motor, without mechanical contacts with low consumption, whereby an electronic switch effecting the control of the consumer is brought by the control impulses produced in the circuit arrangement according to the invention, out of its blocking state into the saturated range and vice versa for an extremely short time, so that the losses occurring during the switching period remain small.

Details of the circuit arrangement according to the invention are hereinafter described as applied to one form of construction illustrated by way of example in the accompanying drawing. This example shows the fundamental construction of an apparatus according to the invention in which transistors are used as electronic amplifier elements. The circuit arrangement according to the invention is composed of eight main stages.

Stage A is a rectangular generator (multivibrator) composed of transistors T1*a* and T1*b*. The charging on the condensers C1*a* and C1*b* takes place according to an *e*-function and has a saw-toothed curve the periodicity of which is determined substantially by the resistances W1*a* and W1*b* as well as the capacities C1*a* and C1*b*. The periodicity of the generator is preferably selectable. The rectangular generator is in particular so constructed that the signal voltage progressing according to an *e*-function is symmetrical.

In stage B the alternating current signal voltage obtained on the condensers C1*a* and C1*b* and whose path runs according to an *e*-function is converted into a direct current voltage function over a push-pull rectifier-amplifier. Thus a fluctuating direct current voltage is obtained whose amplitude runs according to an *e*-function. The function resembles that of a saw-toothed voltage with only positive direct current portions. The output amplitudes attained in this stage can be varied by the potentiometer W*i*2. The push-pull rectifier amplifier B is composed of the transistors T2*a*, T2*b* which are driven in collector connection. The transistors T2*a*, T2*b* have in the emitter circuit the potentiometer W*i*2 as common working resistance.

Stage C represents substantially a Schmitt-Trigger connection which transforms the input signal into impulses of the same height. The operation of the Schmitt-Trigger connection is such that on the input signal exceeding a certain magnitude, the arrangement tips over from a first stable state into a second stable state and remains therein as long as the input signal retains a certain minimum value.

The input signal occurring on the potentiometer W*i*2 of the stage B is fed to the transistor T3 at the entrance to stage C and during a certain period of time its peak surpasses the input threshold value of the Schmitt-Trigger connection (stage C). During this period a rectangular impulse is produced at the output of stage C. The alteration of the duration of impulse or width of impulse is effected with the aid of the potentiometer W*i*2 constituting the working resistance of stage B. Stage C is designated in the drawing as impulse former stage.

A transistor T5 afterconnected to the Schmitt-Trigger connection operates as electronic switch and influences an impedance transducer stage comprising the parts E, F and G, according to its control signal. The object of the impedance transducer stage is to reduce the power required for controlling the electronic power switch D. If, for example, the transistors T*n*, which represent the power switch D, were to be directly controlled with the voltage of the source of voltage supply with the aid of the transistor T5, a relatively high control energy would be required which, for the most part, would be converted into lost heat in the compensating resistances.

The transistors T*n* of the power stage D must be fed with a certain control current given by the input characteristic. For producing the control current a voltage of only about 0.5 volt is required. As the voltage of the source of voltage supply is considerably higher, for example about 24 volts, resistances are necessary in the control circuit for destroying about 98% of the control power and converting it into loss heat. This lost heat can actually become very great. If, for example, the power switch D, composed of the transistors T*n* is designed for a current of 250 a., and a current amplification of $\alpha=25$ is calculated for the transistor switch, a control current consumption of 10 a. will be obtained. In the case of a battery voltage of 24 v., this means a control power of 240 watts. Of this the transistor power switch D itself only requires 2%, that is 4.8 watts, which means however that about 235 watts are converted into heat as lost power. If the whole arrangement is fed from a direct current battery it will be clear that the battery can be used longer for supplying current if these heat losses can be avoided.

The impedance transducer stage consists of a multivibrator E of the driver stage F and of the power end stage G. In the multivibrator rectangular alternating impulses are produced which are amplified in the driver stage F and fed to the power end stage G via the transformer T*r*2. The power end stage G produces an impedance transformation via the transformer T*r*1 and consequently a current translation.

In the rectifier G*r*1 the rectangular alternating impulse frequency is converted into a direct current signal which corresponds to the direct current impulse sequence occurring at the output of the impulse former stage C. This signal is fed to the power switch D as control signal.

The impulse signal occurring at the output of the Schmitt-Trigger connection is fed with controllable modulation ratio to the transistor T5 via a zener diode ZD1. The transistor T5 operates as an electronic switch which opens and closes according to the control signal fed to it. The arrangement in combination with the driver stage F is so chosen that the transistors T7*a* and T7*b* are on the emitter side switched on to the positive pole of the source of voltage supply and switched off therefrom via the transistor T5, according to its modulation. This means that the driver stage F is switched on and off by the transistor T5 according to the impulse signal. The further function takes place in the following manner:

The multivibrator E supplies in push-pull a rectangular alternating impulse frequency which is fed to the driver stage composed of the transistors T7*a* and T7*b* over the condensers C2*a* and C2*b*.

According to the modulation of the signal controlling the transistor T5, the driver stage is switched in or out. It amplifies this signal and conducts it via the transformer T*r*2 to the transistors T8*a* and T8*b* of the power end stage G. If the transistor T5 is, for example, blocked, no amplification can take place within the driver stage F and the power end stage E receives no control signal via the transistor T*r*2. If, on the other hand, the transistor T5 is conductive, the positive potential of the source of voltage supply is fed to the driver stage F, amplifies it and transmits a control signal to the end stage G via the transformer T*r*2. Consequently the direct current impulse sequence occurring at the outlet of stage C with variable modulation is converted into a modulated alternating current impulse sequence, the carrier frequency of which is determined by the frequency of the multivibrator E. This carrier frequency is many times greater than the impulse modulation frequency which is produced by the multivibrator A. The impulse pull thus resulting is fed to the end stage G as control signal.

The power end stage G amplifies the modulated alternating current impulse sequence fed to it over the transformer T*r*2 and transmits the amplified signal to the transformer T*r*1 which effects an impedance transfer to the next following load. This load consists of the input resistance of the power switch D including the rectifier forward resistance of the bridge rectifier G*r*1 and the ohmic resistance of the windings of the transformer T*r*1.

The power end stage G itself now shows certain characteristics. As the stage must be laid out firstly for maximum power output but secondly also for the best possible transfer properties of a rectangular impulse sequence, a switching or circuit arrangement hitherto unknown is used. The primary winding of the transformer Tr1 is divided into two groups of windings of which part 1, consisting of the windings W1*a* and W1*b*, represents the push-pull winding for the collector output circuit of the transistors T8*a* and T8*b*. At the same time, however, a part of the output of the transistors T8*a* and T8*b* is conducted off in collector connection via the emitter and in connection with the part 2 of the winding, consisting of the push-pull windings W2*a* and W2*b*. The actual collector connection certainly has a very high stability and high absence of distortion, but it only allows a relatively small output performance; on the other hand the actual emitter circuit certainly has the advantage of a large output performance but in this type of circuit arrangement certain provisions must be made for stability and absence of distortion. By the circuit arrangement of the stage G according to one part of the invention, sufficient stability and absence of distortion are attained with relatively high output performance.

Further the initial shape of the curve is very greatly improved by leading back, for example, through the condensers C3*a*, C3*b* and the resistances Wi5*a* and Wi5*b*, so that it corresponds to steep flanked rectangular impulses. It is evident that, for example, the second winding of the transformer T*r*1 can be omitted and included in the emitter windings W2*a* and W2*b*.

The transistor power switch D feeds a consumer R representing a complex resistance. A valve V is connected in parallel with this consumer and its forward or passage direction is opposed to the direction of flow of the impulses supplied by the power switch D composed of the transistors T*n*. This valve serves for reducing the voltage peaks occurring on the consumer R, generally having an inductive component, on the opening of the power switch D.

The transistor power switch D comprises in the emitter circuit a rectifier diode G*r*2 which is preloaded via a resistance W*i*6 and consequently has a drop in potential in the forward direction of about 0.7 v. If no control of the power switch D takes place through the power end stage G the base potential of the transistors T*n* is held positive in the power switch D via the resistance W*i*8, whereas the emitter potential remains more negative by 0.7 v. than the base potential owing to the drop in potential on the diode G*r*2. The result attained is that in uncontrolled state the residue current of the transistors T*n* drops to their limit value.

If the consumer R is fed with very narrow impulses, which occurs when the apparatus is regulated to low power output, the danger exists that the fed consumer, which is for example an electric motor, will receive an irregular spasmodic movement. To avoid this the frequency of the fed impulses can, in the case of regulation to low power feed, be increased. This can also be effected by adjusting the resistances or condensers located in the base circuit of the transistors of the multivibrator A.

In summary it can be said that for the low-loss control of an electronic power switch in which power transistors are preferably used, a conversion of a direct current impulse sequence with variable state of modulation into an alternating current impulse sequence corresponding to the modulation state but of higher carrier frequency is effected, whereby the alternating current impulse sequence obtained is amplified and after impedance transformation rectified, so that on the rectifier Gr1 for controlling the electronic power switch a direct current impulse sequence is again produced, the modulation state of which corresponds to that of the initial impulse sequence.

We claim:

1. Circuit arrangement for the control of the energy fed to a user of electric current from a source of D.C. current, preferably for the spasmodic regulation of electric motors and the source of D.C. current producing energy impulses of changeable duration from a pulsating direct voltage, comprising a constantly operating multivibrator with two controllable electronic elements, a control electrode of one of the electronic elements always connected with an output electrode of the second electronic element by a rheostat and a condenser in series connection, a push-pull rectifying amplifier the input of which is connected with the points of connection between the rheostat and the condenser, an output circuit for the push-pull rectifying amplifier of which a potentiometer is switched in, and a mono-stable multivibrator the input circuit of which is connected with the tap of said potentiometer, the control of the vibrator starting only above a certain voltage in the input circuit so that the output value of the mono-stable multivibrator is fed into the input circuit of an electronic commutator and the user being located in the output circuit of the electronic commutator.

2. Circuit arrangement according to claim 1, in which the output value of the mono-stable multivibrator is fed into the input circuit of a second electronic commutator which is located in the input circuit of the first-mentioned electronic commutator.

3. Circuit arrangement according to claim 1, in which the output value of the mono-stable multivibrator is fed into the input circuit of a second electronic commutator which is located in the input circuit of the first-mentioned electronic commutator, and in which the second electronic commutator switches a voltage directly through additional elements to the input circuit of the first-mentioned electronic commutator, and said voltage causing a control of the electronic commutator up to the area of saturation.

4. Circuit arrangement according to claim 1, in which the condensers and rheostats of the constantly operating multivibrator are of equal size.

5. Circuit arrangement according to claim 1, in which means are provided to change the frequency of the signal supplied by the continuously operating multivibrator to magnify the signal to a small power consumption through control of the user.

6. Circuit arrangement according to claim 1, in which the push-pull rectifying amplifier is provided with transistors which are operated in grounded collector arrangement and have the potentiometer as common working resistance in the emitter circuit.

7. Circuit arrangement according to claim 1, in which a rectifier valve is provided connected in parallel with the user, the blocking direction of said valve lying in the direction of flow of the direct current impulses supplied by the electronic commutator.

8. Circuit arrangement according to claim 1, in which the output value of the mono-stable multivibrator is fed into the input circuit of a second electronic commutator which is located in the input circuit of the first-mentioned electronic commutator, and in which the second-mentioned electronic commutator is provided in a circuit which feeds operating voltage to an electronic driver stage so that the input of the electronic driver stage is connected with the output of a second constantly working multivibrator which has a higher frequency than the first-mentioned constantly working multivibrator, the output of the said electric driver being fed to he input of a power-amplifier stage, whose output is fed by means of an impedance transformer to the input of a bridge rectifier, and the output of the said bridge rectifier being connected with the input electrodes of the first-mentioned electronic commutator.

9. Circuit arrangement according to claim 1, in which the output value of the mono-stable multivibrator is fed into the input circuit of a second electronic commutator which is located in the input circuit of the first-mentioned electronic commutator, and in which the second-mentioned electronic commutator is provided in a circuit which feeds operating voltage to an electronic driver stage so that the input of a second constantly working multivibrator which has a higher frequency than the first-mentioned constantly working multivibrator, the output of the staid electric driver being fed to the input of a power-amplifier stage, whose output is fed by means of an impedance transformer to the input of a bridge rectifier, and the output of the said bridge rectifier being connected with the input electrodes of the first-mentioned electronic commutator, the power amplifier stage being built up of power transistors which are operated in a combined collector-emitter circuit.

10. Circuit arrangement according to claim 1, in which the output value of the mono-stable multivibrator is fed into the input circuit of a second electronic commutator which is located in the input circuit of the first-mentioned electronic commutator, and in which the second-mentioned electronic commutator is provided in a circuit which feeds operating voltage to an electronic driver stage so that the input of the electronic driver stage is connected with the output of a second constantly working multivibrator which has a higher frequency than the first-mentioned constantly working multivibrator, the output of the said electric driver being fed to the input of a power-amplifier stage, whose output is fed by means of an impedance transformer to the input of a bridge rectifier, and the output of the said bridge rectifier being connected with the input electrodes of the first-mentioned electronic commutator, the impedance transformer being connected with the input circuit of the electronic driver stage.

11. Circuit arrangement according to claim 1, in which the output value of the mono-stable multivibrator is fed into the input circuit of a second electronic commutator which is located in the input circuit of the first-mentioned electronic commutator, and in which the second-mentioned electronic commutator is provided in a circuit which feeds operating voltage to an electronic driver stage so that the input of the electronic driver stage is connected with the output of a second constantly working multivibrator which has a higher frequency than the first-mentioned constantly working multivibrator, the output of the said electric driver being fed to the input of a power-amplifier stage, whose output is fed by means of an impedance transformer to the input of a bridge rectifier, and the output of the said bridge rectifier being connected with the input electrodes of the first-mentioned electronic commutator, the first-mentioned electronic commutator consisting of a plurality of transistors connected in parallel.

12. Circuit arrangement according to claim 1, in which the output value of the mono-stable multivibrator is fed into the input circuit of a second electronic commutator which is located in the input circuit of the first-mentioned electronic commutator, and in which the second-mentioned electronic commutator is provided in a circuit which feeds operating voltage to an electronic driver stage so that the input of the electronic driver stage is connected with the output of a second constantly working multivibrator which has a higher frequency than the first-mentioned constantly working multivibrator, the output of the said electric driver being fed to the input of a power-amplifier stage, whose output is fed by means of an impedance transformer to the input of a bridge rectifier, and the output of the said bridge rectifier being connected with the input electrodes of the first-mentioned electronic commutator, all of the electronic elements being semiconductor elements.

13. Circuit arrangement according to claim 1, in which the output value of the mono-stable multivibrator is fed into the input circuit of a second electronic commutator which is located in the input circuit of the first-mentioned electronic commutator, and in which the second-mentioned electronic commutator is provided in a circuit which feeds operating voltage to an electronic driver stage so that the input of the electronic driver stage is connected with the output of a second constantly working multivibrator which has a higher frequency than the first-mentioned constantly working multivibrator, the output of the said electric driver being fed to the input of a power-amplifier stage, whose output is fed by means of an impedance transformer to the input of a bridge rectifier, and the output of the said bridge rectifier being connected with the input electrodes of the first-mentioned electronic commutator, the impedance transformer having on its primary side two groups of windings, one of which is fed by the collector circuit from the electronic power amplifier stage.

14. Circuit arrangement according to claim 1, in which the output value of the mono-stable multivibrator is fed into the input circuit of a second electronic commutator which is located in the input circuit of the first-mentioned electronic commutator, and in which the second-mentioned electronic commutator is provided in a circuit which feeds operating voltage to an electronic driver stage so that the input of a second constantly working multivibrator which has a higher frequency than the first-mentioned constantly working multivibrator, the output of the said electric driver being fed to the input of a power-amplifier stage, whose output is fed by means of an impedance transformer to the input of a bridge rectifier, and the output of the said bridge rectifier being connected with the input electrodes of the first-mentioned electronic commutator, the positive pole of the said source of direct current being connected with the base electrode of the first-mentioned electronic commutator by means of a resistance, and the emitter electrodes being connected by a rectifier diode with the emitter electrodes being connected with the negative pole of the said source of direct current by means of a further resistance.

References Cited in the file of this patent

UNITED STATES PATENTS

| | | |
|---|---|---|
| 2,492,168 | Marker | Dec. 27, 1949 |
| 2,720,622 | Deuser | Oct. 11, 1955 |